United States Patent [19]

Wunsch

[11] 4,173,868
[45] Nov. 13, 1979

[54] APPARATUS FOR HIGH PRESSURE-CHARGING AN INTERNAL COMBUSTION ENGINE

[75] Inventor: Alfred Wunsch, Baden, Switzerland

[73] Assignee: BBC Brown Boveri & Company Limited, Baden, Switzerland

[21] Appl. No.: 798,081

[22] Filed: May 18, 1977

[30] Foreign Application Priority Data

Jun. 29, 1976 [CH] Switzerland .................. 8280/76

[51] Int. Cl.² ............................................. F02B 33/42
[52] U.S. Cl. ................................. 60/612; 123/119 CB
[58] Field of Search .................. 60/39.17, 39.45, 599, 60/605, 607, 612; 123/119 C, 119 CB

[56] References Cited

U.S. PATENT DOCUMENTS

| 2,423,527 | 7/1947 | Steinschlaeger | 60/39.17 X |
| 2,461,186 | 2/1949 | Seippel | 60/39.45 X |
| 2,946,184 | 7/1960 | Jendrassik | 60/39.45 X |
| 2,957,304 | 10/1960 | Berchtold | 123/119 C X |
| 3,355,877 | 12/1967 | Chaffiotte | 60/599 |
| 3,398,525 | 8/1968 | Jenny | 60/39.45 X |

*Primary Examiner*—Michael Koczo
*Attorney, Agent, or Firm*—Burns, Doane, Swecker & Mathis

[57] ABSTRACT

Apparatus for high pressure-charging an internal combustion engine in which the pressure drop of the engine exhaust gases is divided into two stages and used to compress the combustion air in two stages. An exhaust-gas turbocharger and a gas-dynamic pressure-wave machine are connected in series on the exhaust-gas side and also on the air side and each machine functions as one stage of the two-stage combustion air compression.

8 Claims, 2 Drawing Figures

APPARATUS FOR HIGH PRESSURE-CHARGING AN INTERNAL COMBUSTION ENGINE

BACKGROUND OF THE INVENTION

The invention concerns an improvement in apparatus for high pressure-charging an internal combustion engine, the pressure drop of the engine exhaust gases being divided into two stages and used to compress the combustion air in two stages.

Exhaust-gas turbochargers are today used almost exclusively for pressure-charging internal combustion engines in order to raise the mean effective pressure. Gas-dynamic pressure-wave machines for this purpose are also known, distinguishing features of these being particularly their rapid response to load changes and the fact that they improve the flexibility of the engine, for which reasons they are employed mainly with vehicle diesel engine (Motortechnische Zeitschrift No. 31 (1970) 1).

A two-stage method of pressure-charging using exhaust-gas turbochargers has also been tried for very high output engines (Swiss Patent No. 371633), the pressure drop of the expanding exhaust gases from the engine being divided between a high-pressure turbine and a low-pressure turbine. In the same manner, the compression of the combustion air took place in a low-pressure stage and a high-pressure stage. Dividing the pressure drop in this way is necessary if the charging-pressure conditions attainable in one stage of the turbocharger are no longer adequate, or the volume throughput range of the compressor at the requisite high pressure ratios is so narrow that it no longer meets the demands made of the engine. With two-stage pressure charging, each stage operates at higher efficiency with a correspondingly smaller pressure ratio over a wider range of throughput.

The use of two exhaust-gas turbochargers in series for the vehicle engine, however, seriously impairs the acceleration capability of the engine/turbocharger system and also the flexibility of the engine. Because the turbochargers are "coupled" with the engine only by way of the exhaust gas, they follow engine load changes only after a certain delay, the length of which depends mainly on the mass inertia of the turbocharger rotor, the method of pressure-charging itself, and on the operating ranges which have to be passed through. It is true that with two-stage pressure-charging the smaller high-pressure turbocharger can be operated on the impulse principle and therefore reacts comparatively quickly to load changes. But the larger low-pressure turbocharger, which has a much greater mass inertia and, moreover, is operated on the constant-pressure principle, follows only very slowly. The result is heavy smoke emission on accelerating, and long response times by the engine. Owing to its large inertia, this system of two-stage pressure-charging is not applicable to vehicle engines which are required to respond very quickly to load changes in order to adapt speedily to changing road and traffic circumstances. This approach thus offers no access to very high mean pressures.

Two-stage pressure-charging with pressure-wave machines alone is also not possible, because with these machines the expansion part and the compression part are not independent of each other. Owing to the direct contact between the expanding gas and the gas being compressed, the pressure levels of these cannot be chosen at will, as otherwise the machine will not operate in the required manner. As far as two-stage pressure-charging with pressure-wave machines is concerned, this fact creates difficulties especially at the lower pressure stage of the high-pressure machine.

SUMMARY OF THE INVENTION

The object of the invention is to create an improved apparatus for high pressure-charging an internal combustion engine such that the pressure-charging device efficiently meets the requirement of a short response time and a wide range of operating characteristics.

This object is achieved by combining an exhaust-gas turbocharger with a gas-dynamic pressure-wave machine, these being connected in series on the exhaust-gas side and the air side, and each being used as one stage, the exhaust-gas turbocharger being employed as the high-pressure stage and the pressure-wave machine as the low-pressure stage.

The two-stage pressure-charging of vehicle engines, in particular, is made possible by such a combination, in which the favorable characteristics of the two machines can be utilized. The benefits are especially evident if the exhaust-gas turbocharger is used for the high-pressure stage, and the pressure-wave machine for the low-pressure stage. The principal advantage, as compared with using two exhaust-gas turbochargers, is that the part having the greatest inertia in a two-turbocharger arrangement, i.e., the relatively large turbocharger of the low-pressure stage (operated at constant pressure), is replaced by the pressure-wave machine, which responds at approximately the speed of sound. In this way the response time of the engine on accelerating can be greatly shortened, and smoke emission reduced. Scavenging of the pressure wave machine presents no difficulties; under all operating conditions it has only to overcome the resistances of any filters or silencers that may be present. Intercooling of the combustion air after the low-pressure stage further improves the efficiency of the charging process. If it should be necessary to cool the high-pressure gases before they enter the turbocharger, a large part of the heat removed can be recovered again by heating the exhaust gases in a reheat loop after the high-pressure stage, thus retaining this heat within the process as a whole. Operation at partial loads also presents no difficulty.

BRIEF DESCRIPTION OF DRAWINGS

Examples of the invention are shown schematically in the drawings, in which.

DETAILED DESCRIPTION OF PREFERRED EMBODIMENTS

Figure 1:
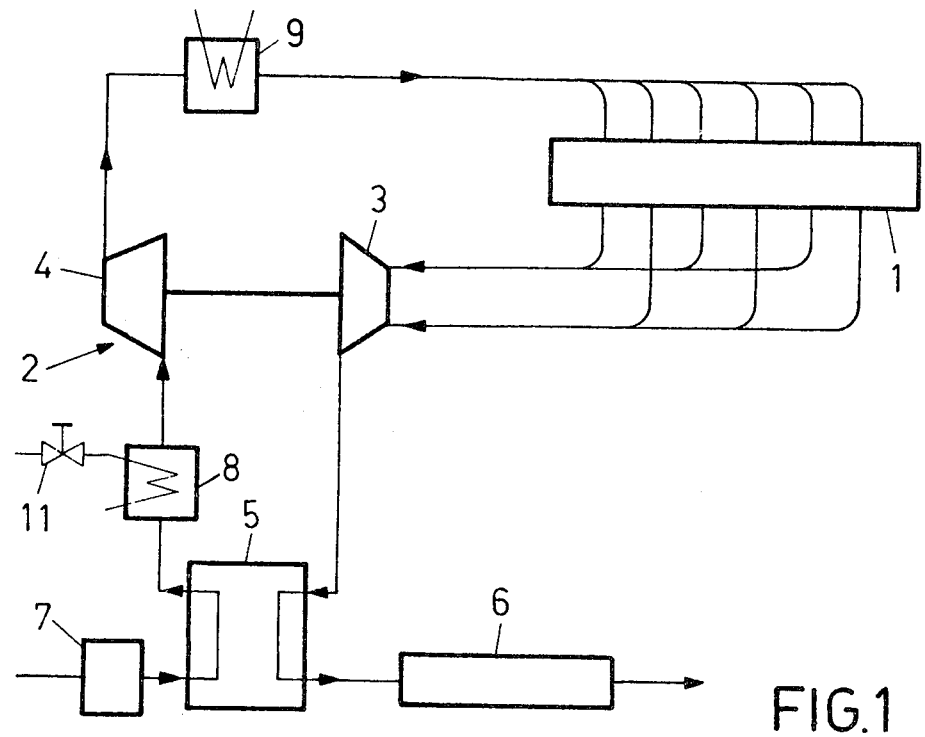
FIG. 1 is a simplified general flow diagram, showing the arrangement of the exhaust gas turbocharger and pressure-wave machine.

In FIG. 1, the vehicle engine 1 has a mean effective pressure which is much greater than 15 kg/cm$^2$. This engine cannot be operated with a single-stage exhaust-gas turbocharger because the attainable charging-pressure ratio is too low, and the working range, which is determined by the surge limit and the intake limit, would become too narrow.

The high-pressure stage of the two-stage pressure-charging system is the exhaust-gas turbocharger 2, which consists essentially of the gas turbine 3 and the compressor 4 which it drives. The gas turbine 3 is fed with exhaust gases from the engine. After expanding partially, these gases flow to the gas-dynamic pressure-wave machine 5 which serves as a low-pressure stage for expanding the exhaust gases and for compressing the combustion air. The exhaust gases are then discharged through the exhaust silencer 6.

The combustion air flows via the intake filter 7 to the pressure-wave machine 5 in which, as stated above, it is compressed to the first pressure stage. It then passes to the compressor 4 in which compression to the higher pressure takes place, and then flows to the engine 1.

To be able to match the turbocharger and the pressure-wave machine more effectively to each other, to adapt the pressure-charging apparatus more closely to the predetermined requirements of the engine, and to increase the flow rate of combustion air, it can be of advantage to arrange an intercooler 8 between the pressure-wave machine 5 and the compressor 4 of the exhaust-gas turbocharger 2, the coolant of the intercooler 8 being adjustable with valve 11. It can also be of benefit to provide a charging-air cooler 9 after the compressor 4 as viewed in the air flow direction.

Two-stage pressure-charging also presents the possibility of reheating the exhaust gas following its expansion in the high-pressure stage, and hence increasing its enthalpy, i.e., its capacity to do work in the low-pressure stage.

Figure 2:
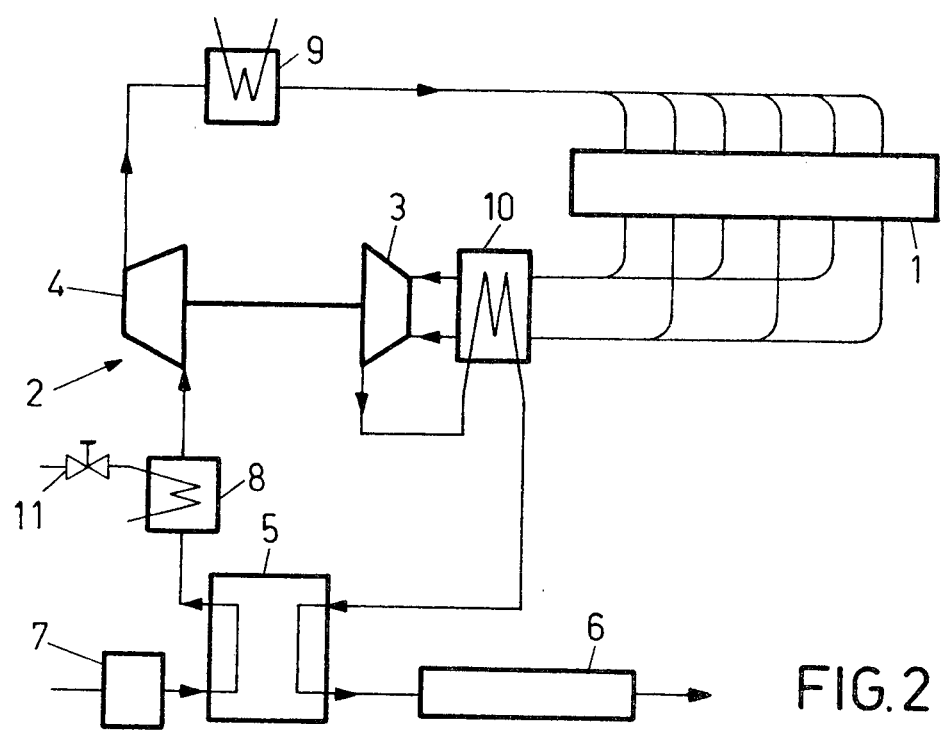
FIG. 2 is the same diagram as FIG. 1, but with reheating the exhaust gases. Identical components in both figures are identified with the same reference symbols.

With the high exhaust-gas temperatures that can occur in the case of engines with high-pressure charging, it may happen that the maximum permissible inlet temperature to the gas turbine of the exhaust-gas turbocharger is exceeded. The exhaust-gas temperature then needs to be lowered. This can be done in any desired manner, but very advantageously in conjunction with reheating of the exhaust gas. A method of putting this concept into practice is illustrated in FIG. 2 and will now be described.

Incorporated into the flow path of the exhaust gases between engine 1 and gas turbine 3 is the exhaust-gas cooler/reheater 10 through which the exhaust gases flow once again after having expanded in the gas turbine, before they pass into the pressure-wave machine 5. By this means, the hot exhaust gas is cooled to an acceptable temperature by exhaust gas of a lower pressure stage, and in the same apparatus the latter gas is simultaneously reheated.

It is also of benefit to operate the exhaust-gas turbocharger comprising the high-pressure stage on the impulse principle, and the pressure-wave machine serving as the low-pressure stage on the constant-pressure principle. It is also to be mentioned that the two machines can be arranged in the opposite sequence, i.e., the pressure-wave machine as the high-pressure stage, and the exhaust-gas turbocharger as the low-pressure stage.

I claim:
1. Apparatus for power generation, comprising:
an internal combustion engine;
an exhaust gas turbocharger machine; and
a gas-dynamic pressure-wave machine, the exhaust gas turbocharger machine and the gas-dynamic pressure-wave machine being connected in series on the exhaust gas side and on the air side with the internal combustion engine, with each machine providing one stage of a two stage combustion air compression and one stage of a two stage engine exhaust gas pressure drop.

2. The power generation apparatus of claim 1, wherein the two stage combustion air compressor includes a relatively high pressure compression and a relatively low pressure compression and wherein the exhaust gas turbocharger provides the relatively high pressure compression and the pressure-wave machine provides the relatively low pressure compression.

3. The power generation apparatus of claim 1, wherein the exhaust-gas turbocharger is an impulse turbocharger and wherein the pressure-wave machine is a constant pressure pressure-wave machine.

4. The power generation apparatus of claim 2, wherein the two stage engine exhaust gas pressure drop includes a relatively high pressure stage and a relatively low pressure stage and wherein the engine further comprises:
means for reheating turbine exhaust gases from the turbocharger machine after expansion in the relatively high-pressure stage.

5. The power generation apparatus of claim 1, further comprising:
an intercooler for the combustion air, the intercooler being provided between the pressure-wave machine and a compressor component of the exhaust gas turbocharger.

6. The power generation apparatus of claim 5, further comprising:
valve means for adjusting a flow of coolant through the intercooler.

7. The power generation apparatus of claim 1, further comprising:
a charging air cooler downstream of a compressor component of the exhaust gas turbocharger.

8. Apparatus for power generation, comprising:
an internal combustion engine;
an exhaust gas turbocharger machine;
a gas-dynamic pressure-wave machine, the exhaust gas turbocharger machine and the gas-dynamic pressure-wave machine being connected in series on the exhaust gas side and on the air side with the internal combustion engine, with each machine providing one stage of a two stage combustion air compression and one stage of a two stage engine exhaust gas pressure drop;
the two stage combustion air compressor including a relatively high pressure compression and a relatively low pressure compression;
the exhaust gas turbocharger providing the relatively high pressure compression and the pressure-wave machine providing the relatively low pressure compression;
the two stage engine exhaust gas pressure drop including a relatively high pressure stage and a relatively low pressure stage; and
means for reheating turbine exhaust gases from the turbocharger machine after expansion in the relatively high pressure stage with heat from relatively hot engine exhaust gases before the relatively hot engine exhaust gases expand in the high-pressure stage.

* * * * *